(12) United States Patent
Sharpless

(10) Patent No.: US 6,869,526 B2
(45) Date of Patent: Mar. 22, 2005

(54) STORM DRAIN FILTER ASSEMBLY

(76) Inventor: S. Robert Sharpless, 333 Beaumont Rd., Devon, PA (US) 19333

( * ) Notice: Subject to any disclaimer, the term of this patent is extended or adjusted under 35 U.S.C. 154(b) by 117 days.

(21) Appl. No.: 10/299,548

(22) Filed: Nov. 20, 2002

(65) Prior Publication Data
US 2004/0094461 A1 May 20, 2004

(51) Int. Cl.$^7$ ................................................. G02F 1/28
(52) U.S. Cl. ..................... 210/164; 210/170; 210/232; 210/457; 210/502.1; 404/5
(58) Field of Search ................................ 210/693, 163, 210/164, 170, 232, 457, 502.1; 404/4, 5

(56) References Cited

U.S. PATENT DOCUMENTS

| | | | |
|---|---|---|---|
| 5,223,154 A | 6/1993 | MacPherson, Jr. et al. | 210/790 |
| 5,284,580 A | 2/1994 | Shyh | 210/163 |
| 5,372,714 A | 12/1994 | Logue, Jr. | 210/164 |
| 5,403,474 A | 4/1995 | Emery | 210/163 |
| 5,744,048 A * | 4/1998 | Stetler | 210/803 |
| 5,849,198 A * | 12/1998 | Sharpless | 210/693 |
| 5,925,241 A | 7/1999 | Aldridge et al. | 210/163 |
| 6,217,756 B1 * | 4/2001 | Martinez | 210/163 |
| 6,270,663 B1 * | 8/2001 | Happel | 210/163 |
| 6,368,499 B1 | 4/2002 | Sharpless | 210/164 |
| 6,533,941 B2 * | 3/2003 | Butler | 210/681 |
| 2004/0016692 A1 * | 1/2004 | Sasaki et al. | 210/473 |
| 2004/0040901 A1 * | 3/2004 | Page | 210/163 |

* cited by examiner

Primary Examiner—Terry K. Cecil
(74) Attorney, Agent, or Firm—LaMorte & Associates

(57) ABSTRACT

A device for removing petroleum based contaminants from the runoff water that passes into a storm drain. The device is a filter apparatus that can be added to a storm drain. The filter apparatus includes a filter cage that defines an open central conduit and a filter cartridge that wraps around the periphery of the filter cage. During normal rain conditions, water enters the sewer grate near the edges of the sewer grate. This water falls through the filter cartridge and is filtered. Solid debris that is mixed with the water is deflected through the central conduit and falls through the filter apparatus. During flood conditions, excess water is allowed to pass through the center conduit of the filter cage unfiltered in order to preserve the water flow capacity of the storm drain.

11 Claims, 2 Drawing Sheets

STORM DRAIN FILTER ASSEMBLY

BACKGROUND OF THE INVENTION

1. Field of the Invention

In general, the present invention relates to filter devices that are contained within the confines of a storm drain. More particularly, the present invention relates to the structure of such filters and the support devices used to position such filters within the storm drain.

2. Description of the Prior Art

In civil engineering design, many modern streets are designed and built with storm drains. The storm drains are periodically located along the curb of the street. The street is graded in such a manner so that any water falling onto the street will flow to one of the storm drains. This prevents water from collecting on the street and inhibiting the flow of traffic along the street.

Traditionally, curbside storm drains contain a catch basin that is connect to a below lying sewer with a large diameter pipe. The catch basin is commonly covered with a grate. The grate enables water to flow into the catch basin but prevents large objects, such as tree branches, from passing into the catch basin and blocking the sewer pipe. The catch basin itself collects debris that is heavier than water but is washed into the storm sewer by the force of flowing water. As a result, storm drains need periodic maintenance, wherein the debris collected in the catch basin is removed.

As water flows over a street to a storm sewer, the water often mixes with oil and other contaminants. The oil comes from automobiles that leak oil. Other petroleum based contaminants include grease, diesel fuel, hydraulic fluid and gasoline. The federal and state environmental protection laws set forth many guidelines governing the disposal of petroleum based contaminants. Generally, it is unlawful to dispose of petroleum based contaminants in the public sewer system or in any other flowing supply of water. As such, the rain runoff that passes into many curb side storm drains fails to meet the state and federal standards due to the petroleum based contaminants that wash into the storm drains with the rain water.

The prior art contains many different types of filter systems that are intended to at least partially purify the runoff water that passes into a storm drain. Certain prior art devices are filters that pass over the grate above the storm sewer. Such a filter is exemplified by U.S. Pat. No. 5,403,474 to Emery, entitled Curb Inlet Gravel Sediment Filter. In such prior art arrangements, the filter itself is accessible above the sewer's grate. Consequently, the filter disrupts the smoothness of a street's surface and therefore is only good in certain temporary applications.

Since the catch basins of many storm drains are made of poured cement, it is not practical to change the structure of existing storm drains in order for those storm drains to accept filters. As a result, many filter configurations have been made that are adapted to be added to existing storm sewer designs. In a typical storm sewer, a ledge is formed around the to rim of the catch basin. The drain grate rests upon the ledge, thereby covering the open top of the catch basin. The depth of the ledge typically corresponds to the thickness of the grate. As a result, the top of the grate will lay in the same plane as does the surface of the street.

In the prior art, there are filter structures that hang in the storm drain catch basin below the grate. Typically, such prior art filter structures engage the same ridge of the catch basin that supports the grate. As a result, a portion of the filter structure must be place in between the grate and the ridge upon which the grate was designed to sit. Such prior art filter structures are exemplified by U.S. Pat. No. 5,223,154 to MacPherson, entitled System For Filtering Liquids In A Catch Basin Using Filters In Series And Overflow Channels; U.S. Pat. No. 5,372,714 to Logue, entitled Storm Sewer Catch Basin And Filter and U.S. Pat. No. 5,284,580 to Shyh, entitled Refuse Collecting Frame For Sewer. One of the problems associated with such prior art filter structures is that the presence of the filter structure under the grate prevents the grate from seating properly onto the ridge at the top of the catch basin. As a result, the grate is held above its normal height, which may cause the grate to protrude above street level. If the grate does extend above street level, the grate becomes a tripping hazard. Furthermore, the grate can be caught by street plows and car tires, wherein the grate can be damaged or accidentally moved out of place.

U.S. Pat. No. 5,925,241, entitled Storm Drain Filter, and U.S. Pat. No. 6,368,499, entitled Storm Drain Assembly With Disposable Filter Cartridge, both belong to the applicant herein. In these patents, the applicant invented a filter structure that can be retroactively attached to a storm drain in a manner where the filter element does not extend above street level or cause the grate of the storm drain to extend above street level. However, in both patents, the filter is the same size as the sewer grate. Consequently, all the water that falls through the sewer grate flows through the filter. Although, this provides good filtration to the water, in certain situations the configuration can cause problems.

During normal rain conditions, water flows into the grate of a sewer at a controlled rate. The water therefore falls through the sewer grate before the water travels more than six inches across the top of the sewer grate. As a consequence, the vast majority of water that flows into a sewer grate passes only through the peripheral areas of any filter that is supported below the sewer grate. The area in the center of the sewer grate receives a relatively small amount of water.

However, during a heavy rain, the flow of water into a sewer grate can exceed the capacity of the sewer grate to receive water. Water therefore pools above the sewer grate and flows into the sewer grate at all points. It is also during period of heavy rain that a great deal of debris can be washed into a sewer grate. Certain types of debris, such as pine needles, leaves, paper, plastic bags and the like can pass through the sewer grate and become stuck on the filter suspended below the sewer grate. Once this happens, the filter becomes obstructed and the flow capacity of the sewer grate is greatly reduced.

A need therefore exits for a filter system for a sewer grate that can filter water during normal rain conditions, yet does not clog or otherwise restrict sewer flow capacity during heavy rain conditions. This need is met by the present invention as described and claimed below.

SUMMARY OF THE INVENTION

The present invention is a device and method for removing petroleum based contaminants from the runoff water that passes into a storm drain. The device is a filter apparatus that can be added to a storm drain. The filter apparatus consists of a filter cage that defines an open central conduit and a filter cartridge that wraps around the periphery of the filter cage. During normal rain conditions, water enters the sewer grate near the edges of the sewer grate. This water falls through the filter cartridge and is filtered. Solid debris that is mixed with the water is deflected through the central conduit and falls through the filter apparatus. During flood conditions, excess water is allowed to pass through the center conduit of the filter cage unfiltered in order to preserve the water flow capacity of the storm drain.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention filter apparatus can be used in many different types of storm drains, the filter apparatus is particularly well suited for use in curb side storm drains that are commonly designed into the sides of paved streets. As a result, by way of an example, the present invention filter apparatus will be described in conjunction with a typical curb side storm drain in order to set forth the best mode contemplated for the present invention.

Figure 1:
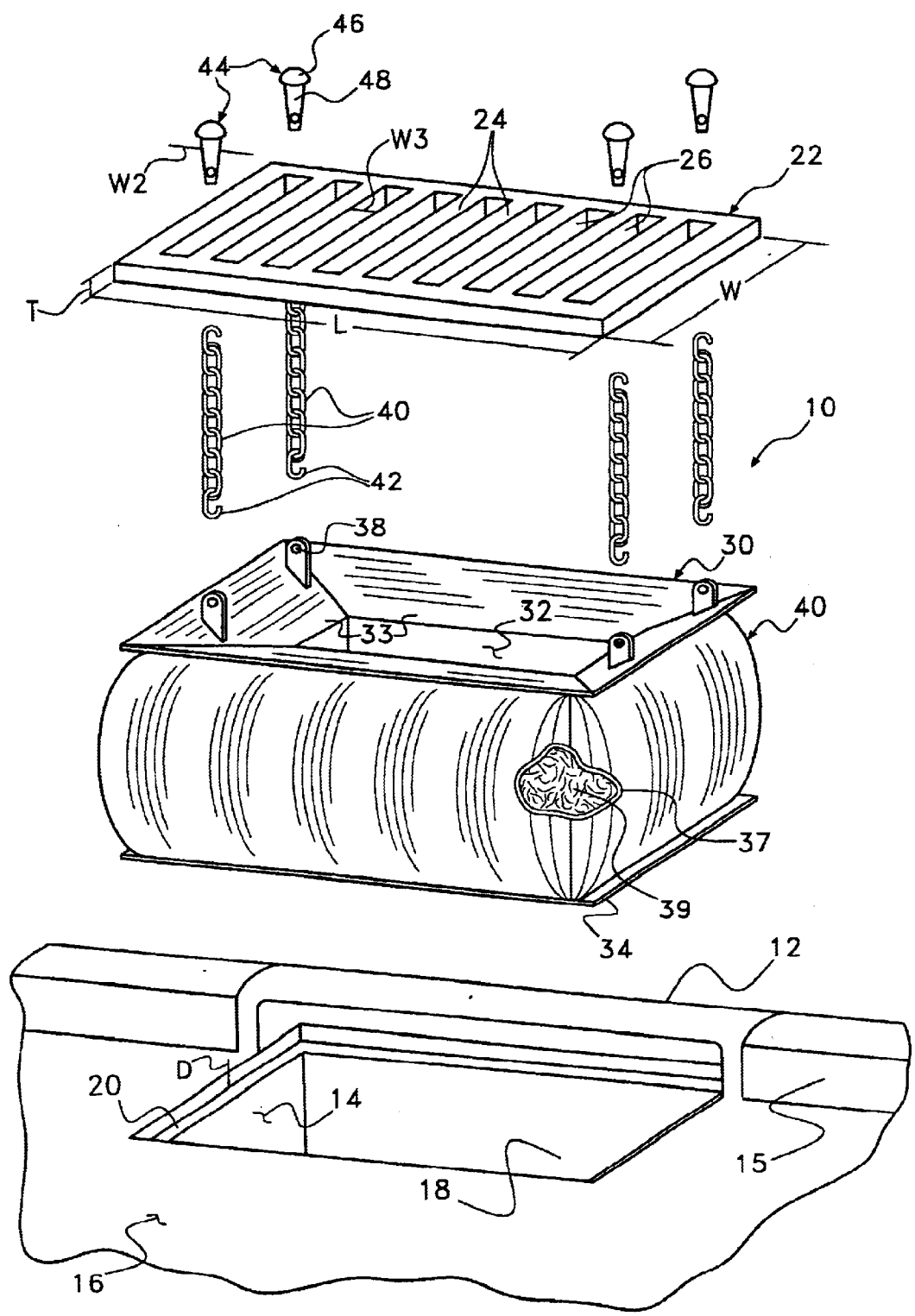
FIG. 1 is an exploded perspective view of an exemplary embodiment of a filter apparatus, shown in conjunction with a typical prior art storm drain.
Figure 2:
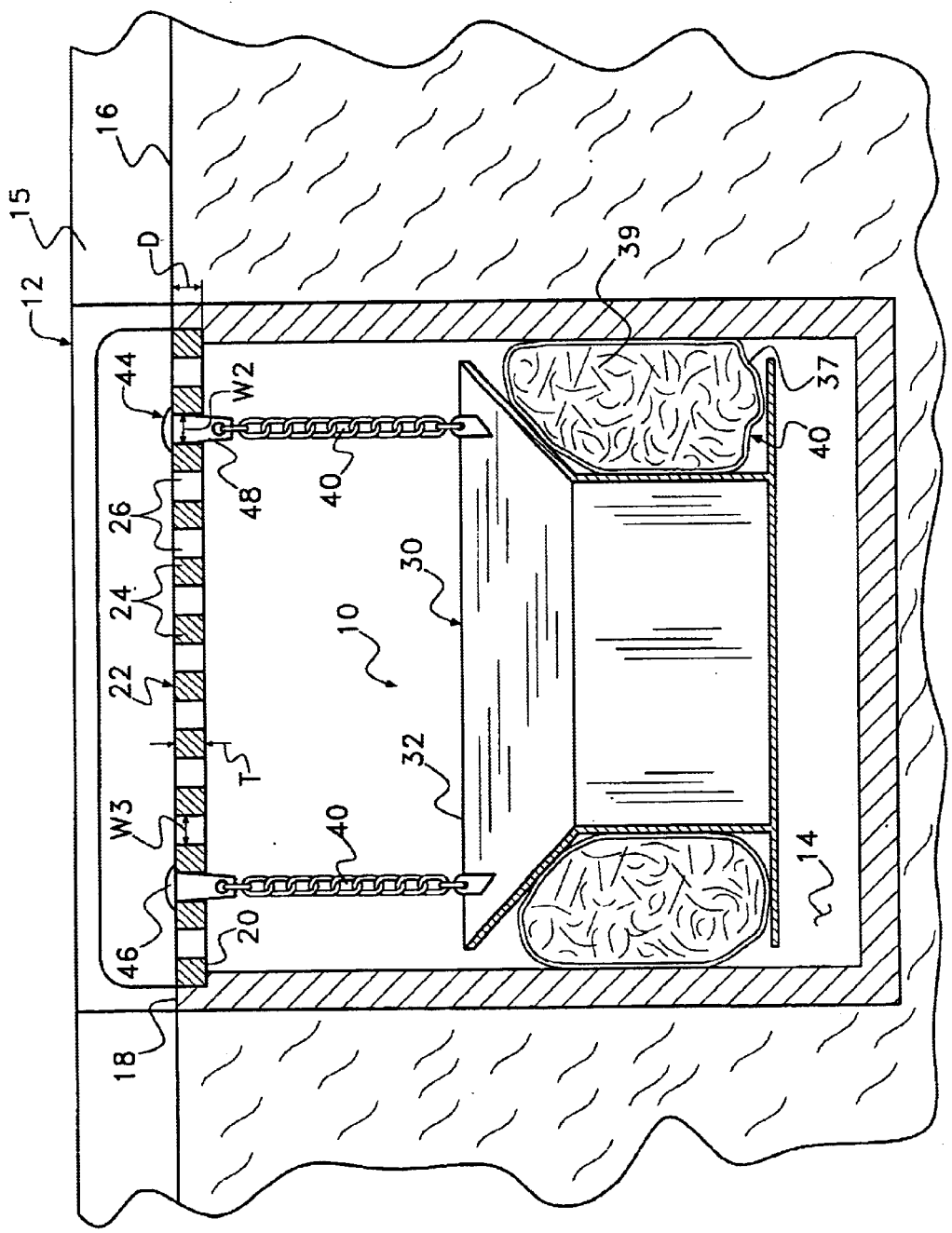
FIG. 2 is a cross-sectional view of the embodiment of the filter apparatus and storm drain shown in FIG. 1.

Referring to FIG. 1 in conjunction with FIG. 2, a first exemplary embodiment of the present invention filter apparatus 10 is shown with a common curb side storm drain 12. The storm drain 12 contains a cement catch basin 14 that lays below the plane of a paved street 16 at a point near the curb 15 of the street 16. The catch basin 14 has an open top 18 that terminates at street level. A ridge 20 is formed on the interior of the catch basin 14 a short distance D below the open top 18 of the catch basin 14.

A grate 22 is provided that covers the open top 18 of the catch basin 14. The grate 22 is typically a cast metal structure having numerous parallel slats 24, whereby water is free to flow through the slots 26 that exist in between each of the parallel slats 24. The grate 22 has a length L1 and a width W1 (FIG. 1) that enables the grate 22 to pass thorough the open end 18 of the catch basin 14. However, the grate 22 is not large enough to pass the ridge 20 in the catch basin 14. Rather, the peripheral edges of the grate 22 abut against the ridge 20 and evenly support the grate 22 in a horizontal plane. The grate 22 has a thickness T that matches the depth D of the ridge 20 below street level. As a result, when the grate 22 is placed onto the ridge 20 in the catch basin 14, the top surface of the grate 22 is supported at approximately the same level as the street 16.

A filter cage 30 is suspended below the grate 22 within the confines of the catch basin. The filter cage 30 defines a central conduit 32 that is open in the center of the filter cage 30. Otherwise, the filter cage 30 has a generally hourglass shape. At the top of the filter cage 30 are sloped surfaces 33 that define the beginning of the central conduit 32. At top of the filter cage 30, the sloped surfaces 33 are at their widest point and define an area at least as large as the sewer grate 22. Consequently any material that falls through the sewer grate 22 will pass into the peripheral area of the filter cage 30.

The sloped surfaces 33 slope inwardly and downwardly, thereby forming a funnel shape. In the center of the funnel shape is the central conduit 32 that passes through the center of the filter cage 30. At the bottom of the filter cage 30 is a mesh support base 34. The support base 34 provides the bottom of a packet surface in which a filter cartridge 40 can rest. However, the support base 34 does not obstruct the central conduit 32 that passes through the filter cage 30.

The central conduit 32 that passes through the filter cage 30 is at its narrowest near the middle of the filter cage 30. At its narrowest point, the central conduit 32 of the filter cage 30 is between 10% and 50% the area of the sewer grate 22.

A filter cartridge 40 is wrapped around the filter cage 30. Once in place, the filter cartridge 40 has a torical shape. The cross-sectional diameter of the filter cartridge 40 at any point is preferably between three inches and fifteen inches. The overall periphery of the filter cartridge 40, once wrapped around the filter cage 30, is at least as large as the periphery of the sewer grate 22. Consequently, any water that falls over the edge of the sewer grate 22 will fall into the material of the filter cartridge 40. However, during flood condition, when water falls through the sewer grate 22 in the center of the sewer grate 22, that water falls through the central conduit 32 in the filter cage 30.

The filter cartridge 40 receives any water that pours through the sewer grate within a predetermined range of the edge of the sewer grate 22. The predetermined range being directly proportional to the cross-sectional width of the filter cartridge 40. The filter cartridge 40 has a pillow construction. That is, the filter cartridge 40 is comprised of an outer scrim bag 37 that confines a loosely bound filter material 39. The scrim bag 37 is made of a synthetic material having hydrophobic properties. The material is manufactured in such a manner so as to define voids in the material sufficient enough in size for water to readily pass. In this manner, the scrim bag 37 does not itself absorb water, and is porous enough to enable water to freely flow through its structure. Suitable materials for the scrim bag 37 include, but are not limited to, a synthetic polyester fabric sold under the trademark DACRON and non-woven polyester felt.

The filter material 39 contained within the scrim bag 37 is a material that absorbs the oil that is mixed within the run-off water. Thus, the filter material 39 removes oil from the water passing through the filter cartridge 40. The oil absorbing filter material 39 has both lipophilic properties and hydrophobic properties. Thus, the filter material 39 absorbs oil contained in the run-off water, yet does not absorb the water itself. Suitable filter material 39 for use in the filter cartridge 40 include, but are not limited to, melt blown polypropylene fibers. Melt blown polypropylene fibers have the appearance and texture of cotton. The loose fibers of the melt blown polypropylene fibers enable the fibers to be densely packed onto the scrim bag 37 without significantly effecting the water permeability of the overall filter cartridge 40.

There are materials other than melt blown polypropylene fibers that have hydrophobic and lipophilic properties. Any such material can be adapted for use in the present invention, provided the material is effective in removing oil from water while permitting a significant water flow rate through the material.

Connection brackets 38 (FIG. 1) are disposed on the top of the filter cage 30. Suspension elements, such as chains 41 or rods, are used to suspend the filter cage 30 below the grate 22 of the storm drain 12. Chains 41 are described by way of example. The bottom of each of the chains terminates with a hook 42 (FIG. 1) or similar configuration that enables the chains 41 to be mechanically attached to the connection brackets 38 on the top of the filter cartridge 30. The chains 41 attach to the filter cage 30 in a removable manner. As such, the filter cage 30 can be removed from the chains 41 and replaced periodically.

The top end of each of the chains 41 attaches to an element that engages the grate 22 of the storm drain 12. The attachment element can be any hook structure that engages the sewer grate. In the shown embodiment, a hook 44 is used to interconnect the chains 41 with the grate 22.

Although any plurality of suspension elements can be used to support the filter cage 30 and filter cartridge 40, in the shown embodiment only two chains 41 are used. The chains attach to opposite ends of the filter cage 30 in line with the center of gravity for the filter cage 30 and filter cartridge 40. In this manner, if the filter cage 30 were ever to inadvertently clog and a heavy rain were to occur, the flow of water into the storm sewer can cause the filter cage 30 and the filter cartridge 40 to tilt to one side, thereby providing an unobstructed pathway through which the storm water can pass.

In operation, the present invention works as follows. First the filter cage 30 and filter cartridge 40 are suspended from a sewer grate 22. Any water that trickles into the sewer grate 22 and flows into the sewer grate 22 near the edge of the sewer grate 22 falls into the filter cartridge 40. During times of heavy rain or other flooding conditions, water will enter the sewer grate 22 across the entire area of the sewer grate 22. Water entering near the edge of the sewer grate 22 will fall through the filter cartridge 40. However, water entering the middle of the sewer grate 22 will fall down through the central conduit 32 in the filter cage 30. Any debris that were to fall through the sewer grate 22 near the edge of the sewer grate 22 would land on the sloped surfaces 33 of the filter cage 30 above the filter cartridge 40. Due to the slope of these surfaces 33 and the washing effect of the incoming water, any such debris would be washed down the center conduit 32 of the filter cage 30. Likewise, any debris that would enter the sewer grate 22 in the middle of the sewer grate 22 would directly fall through the central conduit 23 in the filter cage 30. Consequently, during normal rain conditions, most all of the water that passes through the sewer grate 22 is filtered by the filter cartridge 40. Debris contacts the sloped surfaces 33 of the filter cage 30 and is deflected through the central conduit 23 in the filter cage 30. During flood conditions, some water is let through the filter cage 30 unfiltered, however, the flow capacity of the sewer is not compromised and no debris will clog the system.

If a tarp or some other unusual object is swept into the sewer and does block the filter cage 30 and filter cartridge 40, a heavy flow of water will cause the entire filter cage 30 and filter cartridge 40 to tip to one side, thereby enabling the water to flow past the blocked filter assembly.

From FIG. 1 and FIG. 2, it will be understood that in order to remove the filter cartridge 30, the grate 22 of the storm drain 12 is engaged and lifted upwardly away from the catch basin 14. Since the filter cage 30 is suspended from the structure of the grate 22, the filter cage 30 lifts up and out of the catch basin 14 as the grate 22 is removed. Once the grate 22 and filter cage 30 are removed, the filter cartridge 40 can be replaced by removing the old filter cartridge and replacing it with a new clean filter cartridge. The oil soaked old cartridge can then be either sent to a recycling plant for oil extraction of can be disposed of in an environmentally safe manner.

When storms drains are cleaned, the grate of the storm drain must be removed. Maintenance personnel therefore have the equipment needed to remove the grates from storm drains. As such, a maintenance team during the normal maintenance of the storm drain can easily replace old filter cartridges or add a new filter cartridge to a storm drain not previously containing a filter cartridge.

It will be understood that the embodiments of the present invention described and illustrated herein are merely exemplary and a person skilled in the art can make many variations to the embodiment shown without departing from the scope of the present invention. It should also be understood that the various elements from different embodiment can be mixed together to create alternate embodiments that are not specifically described. All such variations, modifications and alternate embodiments are intended to be included within the scope of the present invention as defined by the appended claims.

What is claimed is:

1. In a storm drain having an open top catch basin and a grate that covers the open top catch basin, a filter apparatus comprising:
    (a) a filter cage that defines an open central conduit that passes unobstructed through said filter cage, said filter cage comprising:
        (i) a first portion having an upper end and a lower end;
        (ii) a second portion of sloped water-permeable walls attached to said upper end of the first portion and extending upwardly and outwardly toward said grate;
        (iii) a mesh support extending outwardly from said lower end of said first portion to form a filter pocket that extends around said first portion between said sloped walls and said mesh support;
    (b) a filter cartridge positioned within said filter pocket and supported by said filter cage encircling at least a portion of said open central conduit; and
    (c) suspension elements connected to said grate and said cage that suspend said filter cage below said grate,
    wherein said filter apparatus is configured such that water entering from around the periphery of the grate flows through said sloped walls to be filtered through said filter cartridge, and during flood conditions excess water flows along said sloped walls and through said open central conduit bypassing said filter cartridge.

2. The apparatus according to claim 1, wherein said sloped walls terminate at an open top end that faces said grate.

3. The apparatus according to claim 2, wherein said central conduit narrows below said open top end to an area between 10% and 50% that of said open top end of said sloped walls.

4. The apparatus according to claim 1, wherein said filter cartridge has a thickness of between three inches and fifteen inches.

5. The apparatus according to claim 1, wherein said filter cartridge contains an oil absorbing material.

6. The apparatus according to claim 1, further including grate engagement elements that selectively engage said grate and connect said grate to said suspension elements.

7. The apparatus according to claim 1, wherein said filter cage and filter cartridge are balanced around said suspension elements, wherein said filter cage and filter cartridge will tilt about said suspension elements when caused to be unbalance by flowing water.

8. A storm drain apparatus, comprising:
    a catch basin having an open top;
    a removable grate covering said open top of said catch basin, wherein said grate defines a plurality of openings through which water can flow;

a filter cage that defines an open central conduit that passes unobstructed through said filter cage, said filter cage comprising:
(i) a first portion having an upper end and a lower end;
(ii) a second portion of sloped water-permeable walls attached to said upper end of the first portion and extending upwardly and outwardly toward said grate;
(iii) a mesh support extending outwardly from said lower end of said first portion to form a filter pocket that extends around said first portion between said sloped walls and said mesh support;
a filter cartridge supported by said filter cage that encircles at least part of said open central conduit;
at least one suspension element suspending said filter cage and said filter cartridge below said grate;
wherein said filter apparatus is configured such that water entering from around the periphery of the grate flows through said sloped walls to be filtered through said filter cartridge, and during flood conditions excess water flows along said sloped walls and through said open central conduit bypassing said filter cartridge.

9. The apparatus according to claim 8, wherein said sloped walls terminate at an open top end that faces said grate.

10. The apparatus according to claim 9, wherein said open central conduit narrows below said open top end to an area between 10% and 50% that of said open top end.

11. The apparatus according to claim 8, wherein said filter cartridge contains an oil absorbing material.

* * * * *